United States Patent [19]
Aritsuka et al.

[11] Patent Number: 5,346,682
[45] Date of Patent: Sep. 13, 1994

[54] PROCESS FOR THE PREPARATION OF PARTIALLY-SUBSTITUTED FLUOROSILANE

[75] Inventors: Makoto Aritsuka, Yamaguchi; Atsuhisa Mimoto, Kanagawa; Isao Harada, Yamaguchi, all of Japan

[73] Assignee: Mitsui Toatsu Chemicals, Inc., Tokyo, Japan

[21] Appl. No.: 156,702

[22] Filed: Nov. 24, 1993

[30] Foreign Application Priority Data

Nov. 27, 1992 [JP] Japan .................. 4-318816

[51] Int. Cl.$^5$ ............................. C01B 33/08
[52] U.S. Cl. ................................ 423/342
[58] Field of Search ....................... 423/342

[56] References Cited

U.S. PATENT DOCUMENTS 2,395,826  3/1946  Hill et al. .................. 423/342
4,457,901  7/1984  Kitsugi et al. ............. 423/342 X

FOREIGN PATENT DOCUMENTS 2579970  4/1985  France .
61-151015  7/1986  Japan .

OTHER PUBLICATIONS

Chemical Abstracts, vol. 106, No. 8, Feb. 23, 1987, No. 52738y, p. 148.
Chemical Abstracts, vol. 106, No. 8, Feb. 23, 1987, No. 52737x, p. 148.
Chemical Abstracts, vol. 110, No. 2, Jan. 9, 1989, No. 10689k, p. 140.
Chemical Abstracts, vol. 114, No. 12, Mar. 25, 1991, No. 105234e, p. 171.
Chemical Abstracts, vol. 119, No. 12, Sep. 20, 1993, No. 120683x.
Chemical Abstracts, vol. 119, No. 20, Nov. 15, 1993, No. 206562u.

*Primary Examiner*—Paul F. Shaver
*Attorney, Agent, or Firm*—Burns, Doane, Swecker & Mathis

[57] ABSTRACT

A process is provided by the present invention for the preparation of a partially-substituted fluorosilane represented by the following formula: $SiH_nF_{4-n}$ wherein n stands for an integer of 1 to 3. The process comprises converting a corresponding partially-substituted chlorosilane represented by the following formula: $SiH_nCl_{4-n}$ wherein n has the same meaning as defined above into the partially-substituted fluorosilane by halogen replacement while using a fluorinating agent. The fluorinating agent is zinc fluoride having a water content not higher than 0.2 wt. %. Preferably, the size of crystallites in the direction of a (110) plane of the zinc fluoride is at least 500 Å.

4 Claims, 2 Drawing Sheets

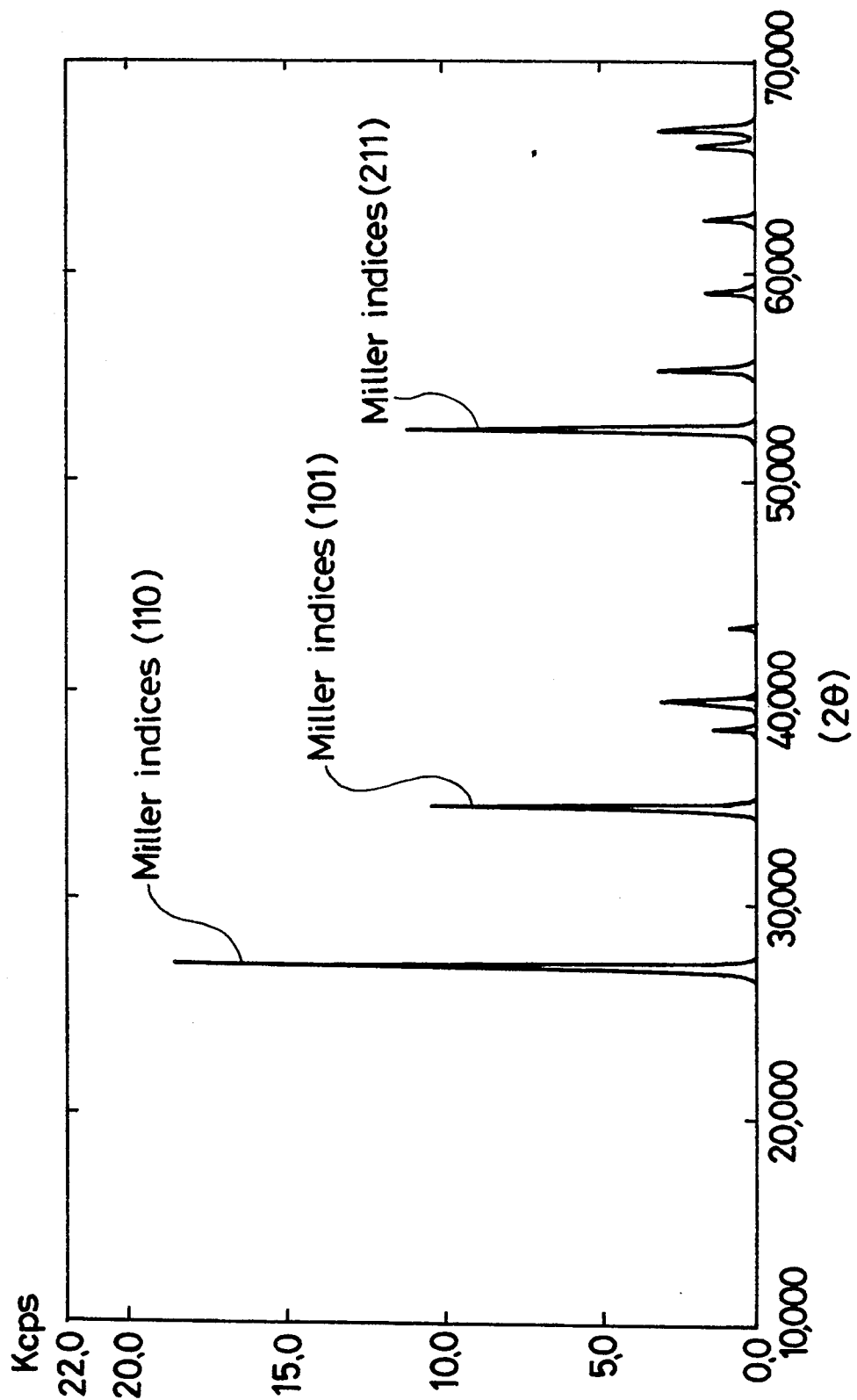

PROCESS FOR THE PREPARATION OF PARTIALLY-SUBSTITUTED FLUOROSILANE

BACKGROUND OF THE INVENTION

1. Field of the Invention

This invention relates to a process for the preparation of a partially-substituted fluorosilane. More specifically, the present invention is concerned with an improvement in a process for preparing a fluorosilane (e.g., monofluoromonosilane, difluoromonosilane, trifluoromonosilane) by halogen substitution.

2. Description of the Related Art

Partially-substituted fluorosilanes are useful for the formation of thin films of fluorinated amorphous silicon.

Known processes for the preparation of a partially-substituted fluorosilane include the so-called halogen substitution process in which a corresponding chlorosilane is fluorinated with a fluorinating agent.

Use of zinc fluoride (hereinafter referred to as "$ZnF_2$") as the fluorinating agent is disclosed in Japanese Patent Laid-Open No. 151015/1986. Further, this patent publication discloses that all equipments employed in the reaction, to say nothing of $ZnF_2$, require full drying immediately before their employment because a chlorosilane or fluorosilane undergoes hydrolysis in the presence of water and also that the drying of $ZnF_2$ can be achieved sufficiently by heating it, for example at 200° C. for 4 hours.

It has however been found that, when halogen substitution of a partially-substituted chlorosilane is carried out using $ZnF_2$ treated as described above, fluorosilanes other than the corresponding partially-substituted fluorosilane, silanes and silicon tetrafluoride are byproduced.

SUMMARY OF THE INVENTION

With the foregoing problem in view, the present inventors have attempted to find out a fluorinating agent which features easy handling and good conversion upon preparation of a partially-substituted fluorosilane with high purity by the halogen replacement technique. As a result, it has been found that the above object can be attained by improving especially the treatment of $ZnF_2$, leading to the completion of the present invention.

In one aspect of the present invention, there is thus provided a process for the preparation of a partially-substituted fluorosilane represented by the following formula: $SiH_n F_{4-n}$ wherein n stands for an integer of 1 to 3, said process comprising converting a corresponding partially-substituted chlorosilane represented by the following formula: $SiH_nCl_{4-n}$ wherein n has the same meaning as defined above into the partially-substituted fluorosilane by halogen replacement while using a fluorinating agent, wherein the fluorinating agent is zinc fluoride having a water content not higher than 0.2 wt. %.

Owing to the use of zinc fluoride having a water content not higher than 0.2 wt. % as a fluorinating agent, the process according to the present invention can prepare the partially-substituted fluorosilane in a far higher yield with less analogous impurities compared with conventional zinc fluoride.

BRIEF DESCRIPTION OF THE DRAWINGS

FIG. 2 is an X-ray diffractometer pattern of zinc fluoride.

Figure 1:
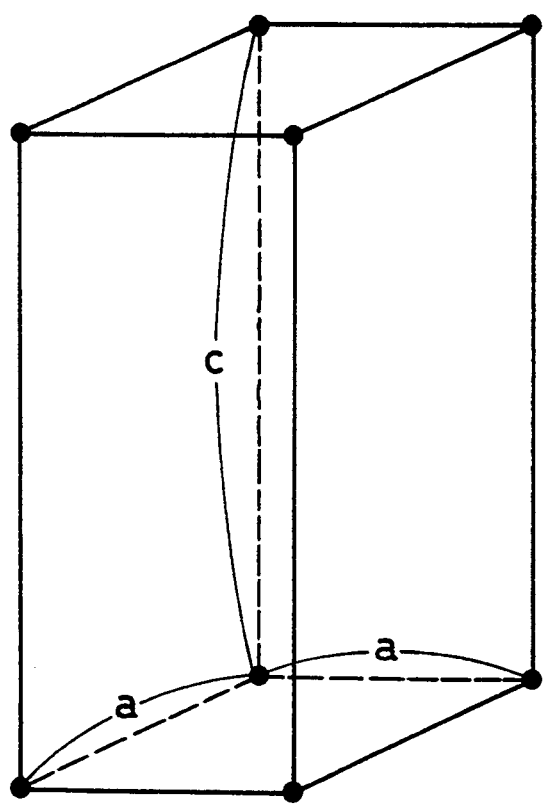
FIG. 1 is a clinographic projection of zinc fluoride of the tetragonal crystal system.

DETAILED DESCRIPTION OF THE INVENTION $ZnF_2$ which is employed as a fluorinating agent for halogen replacement in the present invention must have a water content not higher than 0.2 wt. %. If the halogen replacement of a partially-substituted chlorosilane is conducted using $ZnF_2$ whose water content exceeds 0.2 wt. %, fluorosilanes other than the corresponding partially-substituted fluorosilane, silanes, silicon tetrafluoride and the like are byproduced in greater amounts. It is therefore not preferred to use $ZnF_2$ having such a high water content.

The term "water content" as used herein means the weight percentage of water including both adsorbed water and water of crystallization. Since a chlorosilane or fluorosilane tends to undergo hydrolysis in the presence of water, $ZnF_2$ employed in the reaction should be dried sufficiently. $ZnF_2$ is considerably dry when it has been obtained through the reaction between hydrated zinc oxide or hydrated zinc carbonate and hydrogen fluoride or by heating commercial $ZnF_2$ tetrahydrate at 150°–200° C. in the atmosphere. Its water content is however higher than 0.2 wt. % and is not considered to be low enough for the preparation of a partially-substituted fluorosilane.

To obtain $ZnF_2$ whose water content is not higher than 0.2 wt. %, there are several methods.

As a preferred method, for example, $ZnF_2$ can be subjected, after it has been dried in the above-described manner, to heat treatment in an inert gas atmosphere or in a vacuum, preferably at 400°–700° C., more preferably 500°–600° C. for 1 to 20 hours.

As another preferred method, dried zinc oxide or zinc carbonate can be reacted with dried hydrogen fluoride so that dried $ZnF_2$ is obtained. In this case, the zinc oxide, zinc carbonate and hydrogen fluoride can preferably have a water content of 1 wt. % or lower.

When conducting the reaction with hydrogen fluoride, it is more convenient to perform it in the presence of an alcohol because the target product, $ZnF_2$, can be obtained without allowing water, which results from the reaction, to be taken in $ZnF_2$ so formed.

It is a preferred embodiment to use zinc fluoride of 500 Å or greater in terms of the size of crystallites of the (110) plane. Such zinc fluoride makes it possible to improve the yield and also to lower the byproduction rates of analogous compounds.

A description will now made of crystals. A crystal generally means a body formed of atoms, ions or molecules arranged regularly in three dimensions. For example, a $ZnF_2$ crystal is formed of fluorine ions $F^-$ and zinc ions $Zn^{2+}$ arranged alternately and remains neutral electrically. It is known that the minimum unit (unit cell) of a $ZnF_2$ crystal is a cube. The lengths (a,b,c) of respective axes of the unit cell and the values of angles ($\alpha\beta\gamma$) between the respective axes are called "lattice constants". All crystals can be defined by such lattice constants. Relying upon the symmetry of each unit cell, all crystals can be classified to seven types of crystal systems. $ZnF_2$ is known to belong to the tetragonal crystal system shown in FIG. 1. Expressed by lattice constants, the lengths of its axes are (a,a,c) while the angles between the respective axes are (90°.90°,90°).

A crystal can be considered to have been formed by repeating or stacking such unit cells. Corners (vertices) of each unit cell are called "lattice points". Planes containing such lattice points are called "lattice planes", which are considered to exist in an infinite number. Such lattice planes extend in parallel at constant intervals therebetween. The type of each lattice plane is expressed by a set of integers called "Miller indices (plane indices)". When a lattice plane extends crossing axes X,Y,Z of rectangular coordinates, the respective intercepts are expressed in terms of the lengths of the corresponding axes and a combination of three numbers obtained as the reciprocals of these numbers are multiplied by a smallest number to make all the reciprocals become integers, whereby Miller indices are obtained. The (110) plane indicates a plane which crosses the X- and Y-axes at the intercepts, respectively, and extends in parallel with the Z-axis. As is understood from the foregoing, Miller indices are generally indicated using symbols (hkl) (h,k,l: integers).

When a crystal is exposed to X rays, diffraction takes place. The direction of the diffraction and the intensity of X rays so diffracted are inherent to the crystal. It is therefore possible to determine the structure of a crystal by measuring the angle of diffraction and the intensity of X rays. This method is generally called "X-ray diffractometry". Among the wavelength $\lambda$ of X rays irradiated onto a crystal, an interplanar distance d between certain lattice planes of the crystal and an angle $\theta$ at which the X rays are reflected to form diffracted X rays, the following formula (1) called "Bragg condition" is established:

$$n\lambda = 2d \sin \theta \qquad (1)$$

where n is called an "order of diffraction" and takes a positive integer,

As has been described above, each crystal has an inherent interplanar distance d in accordance with the arrangement of atoms therein so that an inherent diffraction fraction pattern is obtained. An X-ray diffractometric pattern of $ZnF_2$ is shown in FIG. 2. As is shown in the figure, the peak corresponding to the (110) plane is the greatest. It is hence understood that X rays diffracted by the (110) plane has the greatest intensity.

The "crystallite size D" as used in the present invention is a kind of particle size of crystals. The crystallite size D can be calculated in accordance with the following formula (2) from the half band width of the integrated intensity of diffracted X rays (peak area) corresponding to each lattice plane in an X ray diffractometric pattern obtained by the X-ray diffraction analysis:

$$D = 0.9\lambda/\beta \cos \theta. \qquad (2)$$

where D is the size of crystallite (Å), $\lambda$ is the wavelength of X rays used in the measurement, $\theta$ is a Bragg angle, and $\beta$ is a half band width (rad) [P. Scherrer, Goettingen Nachr., 98 (1918).]

It is envisaged from the above formula that, as the crystallinity becomes better, $\beta$ approaches toward 0 without limit and the value of D increases infinitely.

The size of crystallites obtained by the above-described method is the size as viewed in the direction (vector) perpendicular to the X ray diffracted plane (hkl) used for the measurement, and is generally different from a particle size obtained by a method such as the particle size analysis by sieving, a microscope or a settling speed.

$ZnF_2$ used in the present invention can preferably has a crystallite size greater than 500 Å as viewed in the direction of the (110) plane. Use of such $ZnF_2$ makes it possible to lower byproduction of fluorosilanes other than the corresponding partially-substituted fluorosilane, fluorosilanes, silanes ($SiH_4$), silicon tetrafluoride ($SiF_4$) and the like.

When $SiHF_3$ is prepared, for example, such $ZnF_2$ is effective especially in lowering the byproduction of $SiF_4$. Described more specifically, upon preparation of a partially-substituted fluorosilane from its corresponding partially-substituted chlorosilane as a starting material, it is possible to suppress the byproduction of a fluorosilane substituted by one more fluorine atom than the formula: $SiH_n F_{4-n}$ (n: integer of 1 to 3).

Although its detailed reason is still unknown, the present inventors presumes as will be described next.

A $ZnF_2$ crystal is a cubic crystal as described above. On most of its crystal surface, a reaction to form a corresponding fluorosilane to a starting material is considered to take place. In contrast, portions corresponding to the vertices of the cubic crystal are generally considered to have high activity so that the fluorination proceeds further to form a fluorosilane substituted by one more fluorine atom. Accordingly, control of the size of crystallites to a particular value or greater is expected to relatively decrease the number of high-activity points, leading to inhibition to the occurrence of the above-described analogous impurity.

To obtain anhydrous zinc fluoride having a crystallite size greater than 500 Å in the direction of the (110) plane, there are several processes.

It is preferred, for example, to react zinc oxide or zinc carbonate having a water content not greater than 1 wt. % with hydrogen fluoride having a water content not greater than 1 wt. %. Further, it is also suitable to use $ZnF_2$ which has been obtained by reacting a zinc compound having a water content not higher than 1 wt. % with fluorine gas having a purity of 99% or higher. Illustrative examples of the zinc compound can include ZnO, $ZnCO_3ZnCl_2$ and $ZnBr_2$. If the purity fails meet the above condition, the resulting $ZnF_2$ tends to have a smaller crystallite size. When $ZnF_2$ is synthesized by one of the above reactions, the molar ratio of zinc oxide or zinc carbonate to hydrogen fluoride or the molar ratio of the zinc compound to fluorine gas can be set preferably at 1:2 to 1:10, more preferably at 1:3 to 1:5.

It is also necessary to sufficiently dry $ZnF_2$ and equipments immediately before their use in the halogen replacement reaction.

In the halogen replacement technique, it is preferred to contact the chlorosilane with $ZnF_2$ by causing the chlorosilane to pass in a gaseous form through a $ZnF_2$-packed layer as disclosed in Japanese Patent Laid-Open No. 147,920/1993 although the present invention is not limited to the use of such a contacting method.

The reaction between the chlorosilane and $ZnF_2$ is a significantly exothermic reaction. Since the resulting partially-substituted fluorosilane is thermally unstable, consideration for the effective removal of the resulting heat is needed to obtain the fluorosilane with high purity. It is an effective measure for the prevention of side reactions to conduct the reaction by suspending $ZnF_2$ in an organic solvent such as ethyl ether and then adding the chlorosilane to the suspension.

The reaction temperature can range preferably from −30° C. to 40° C., more preferably from −10° C. to 5° C. Reaction temperatures lower than −30° C. tend to lower the conversion of the halogen replacement reaction. Conversely, reaction temperatures higher than 40° C. tend to induce thermal decomposition of the resulting partially-substituted fluorosilane and hence to lower the conversion.

The present invention will hereinafter be described specifically by the following examples and comparative examples. It is however borne in mind that the present invention shall not be limited thereto.

EXAMPLE 1

$ZnF_2.4H_2O$ was heated at 200° C. for 4 hours to dehydrate the same, followed by heating for further 2 hours at 600° C. in a vacuum. After the heat treatment, the $ZnF_2$ so dehydrated was placed in a polyethylene bag and stored in a desiccator.

Before using the ZnF2, its temperature variations were measured from room temperature to 700° C. by a differential thermobalance in a helium atmosphere. As a result, the weight loss was found to be 0.14 wt. %. Two hundreds grams of the $ZnF_2$ were placed in a 200 ml glass flask and the interior of the reaction system was thoroughly purged with $N_2$. Under a $N_2$ gas stream, 100 g of $SiHCl_3$ were fed at a flow rate of 0.5g/min into the flask. During the reaction, the flask was immersed in iced water so that the reaction temperature was prevented from rising.

The gas produced through the reaction in the flask was collected by a liquefied nitrogen gas trap after impurities were removed by a dry ice-acetone trap. Based on the $SiHCl_3$, the yield was 77%. Incidentally, the purity of the collected gas ($SiHF_3$) was 98 vol. % and the contents of analogous impurity gases were each not higher than 0.5 vol. % as shown in Table 1.

EXAMPLE 2

$ZnF_2.4H_2O$ was subjected to dehydration at 200° C. for 4 hours, followed by heat treatment for further 2 hours at 600° C. in a $N_2$ gas atmosphere. The $ZnF_2$ so obtained was the stored in a similar manner to Example 1. Its weight loss before use was measured as in Example 1. The weight loss was found to be 0.17 wt. %. Two hundreds grams of the $ZnF_2$ were placed in a 1 l glass flask and then suspended in 400 ml of dry anisole.

After the interior of the reaction system was thoroughly purged with N2, 100 g of $SiHCl_3$ were fed under stirring at a flow rate of 0.5g/min into the flask. During the reaction, the flask was immersed in iced water so that the reaction temperature was prevented from rising. Further, the flask was fitted with a reflux condenser to reflux the anisole.

The reaction gas produced through the reaction in the flask was collected by a liquefied nitrogen gas trap after impurities were removed by a dry ice-acetone trap. Based on the $SiH_3Cl$, the yield was 85%. Incidentally, the purity of the collected gas ($SiH_3F$) was 98 vol. % and the contents of analogous impurity gases were each not higher than 0.5 vol. % as shown in Table 10 1.

EXAMPLE 3

$ZnF_2$ which had been obtained by a reaction between ZnO and $F_2$ gas was stored in a similar manner to Example 1. Its weight loss before use was measured as in Example 1. The weight loss was found to be 0.18 wt. %. Using 200 g of the $ZnF_2$ and $SiH_2Cl_2$, preparation of $SiH_2F_2$ was conducted in a similar manner to Example 2.

Based on the $SiH_2Cl_2$, the yield was 85 vol. %.

Incidentally, the purity of the collected gas ($SiH_2F_2$) was 98 vol. % and the contents of analogous impurity gases were each not higher than 0.5 vol. % as shown in Table 1.

Comparative Example 1

$ZnF_2$ which had been obtained by subjecting $ZnF_2.4H_2O$ to dehydration at 200° C. for 4 hours was stored in a similar manner to Example 1. Its weight loss before use was measured. The weight loss was found to be 1.84 wt. %. A reaction was conducted by the same procedures as in Example 1 except for the use of the $ZnF_2$ so prepared. As a result, it was found that, as shown in Table 1, analogous impurities other than $SiHF_3$ were byproduced more and the yield of $SiHF_3$ was lower, both compared with Example 1.

Comparative Example 2

A reaction was conducted by the same procedures as in Example 2 except for the use of the same $ZnF_2$ as that employed in Comparative Example 1. As a result, it was found that, as shown in Table 1, analogous impurities other than $SiH_3F$ were byproduced more and the yield of $SiH_3F$ was lower, both compared with Example 1.

Comparative Example 3

A reaction was conducted by the same procedures as in Example 3 except for the use of the same $ZnF_2$ as that employed in Comparative Example 1. As a result, it was found that, as shown in Table 1, analogous impurities other than $SiH_2F_2$ were byproduced more and the yield of $SiH_2F_2$ was lower, both compared with Example 1.

TABLE 1

| | | Example | | | Comp. Ex. | | |
| --- | --- | --- | --- | --- | --- | --- | --- |
| | | 1 | 2 | 3 | 1 | 2 | 3 |
| Yield (%) | | 77 | 85 | 85 | 52 | 68 | 74 |
| Analysis value of collected gas (vol. %) | $SiHF_3$ | 98 | ≦0.5 | ≦0.5 | 87 | 7 | 16 |
| | $SiH_3F$ | ≦0.5 | 98 | ≦0.5 | 2 | 82 | ≦0.5 |
| | $SiH_2F_2$ | ≦0.5 | ≦0.5 | 98 | 3 | 4 | 77 |
| | $SiF_4$ | ≦0.5 | ≦0.5 | ≦0.5 | 5 | 3 | 2 |
| | $SiH_4$ | ≦0.5 | ≦0.5 | ≦0.5 | 3 | 4 | 4 |

EXAMPLE 4

Anhydrous $ZnF_2$ was synthesized by reacting at 100° C. ZnO and HF, whose water contents were 0.5 wt. % and 1 wt. % respectively, at a molar ratio of 1:4. The anhydrous $ZnF_2$ was then placed in a polypropylene bag and stored in a desiccator. The X-ray diffraction intensity of the (110) plane of the $ZnF_2$ was measured by an X-ray diffractometer. From the results, the size of crystallites in the direction of the (110) plane was calculated. It was found to be 546 Å. Five hundreds grams of the $ZnF_2$ were charged in a 3 f glass flask equipped with a stirrer and the interior of the flask was thoroughly purged with $N_2$. Thereafter, 100 g of $SiHCl_3$ were fed at a flow rate of 0.5 g/min to the flask. Incidentally, the flask was immersed in iced water during the reaction so that the reaction temperature was prevented from rising.

Gas produced from the flask was guided to a dry ice-acetone trap to remove impurities and was then collected in a liquefied nitrogen trap. Based on the $SiHCl_3$, the yield of $SiHF_3$ was 90 vol. %. The purity of the collected gas (SiHF₃) was 99 vol. % and, among analogous impurity gases, the content of SiF₄ was 0.7 vol. % and the contents of the other fluorosilanes were each not higher than 0.1 vol. %, as shown in Table 2.

EXAMPLE 5

Anhydrous ZnF₂ was synthesized by reacting at 25° C. 1.2 moles of ZnCO₃ having a water content of 1 wt. % with an excess amount, i.e., 8 moles of F₂ having 99.0 wt. % purity. The anhydrous ZnF₂ was then stored in the same manner as in Example 4. The size of crystallites in the (110) plane of the ZnF₂ was calculated in the same manner as in Example 4. It was found to be 527 Å. One hundreds grams of the ZnF₂ were charged in a 1 l glass flask equipped with a stirrer and suspended in 500 ml of anisole. After the interior of the flask was thoroughly purged with N₂, 100 g of SiH₂Cl₂ were fed at a flow rate of 0.5 g/min to the flask under stirring. Incidentally, the flask was immersed in iced water during the reaction so that the reaction temperature was prevented from rising. Further, the flask was also fitted with a reflux condenser to prevent evaporation of the anisole.

Reaction gas produced from the flask was guided to a dry ice-acetone trap to remove impurities and was then collected in a liquefied nitrogen trap. Based on the SiH₂Cl₂, the yield of SiH₂F₂ was 90 vol. %. Incidentally, the purity of the collected gas (SiH₂F₂) was 99 vol. % and, among analogous impurity gases, the content of SiHF₃ was 0.7 vol. % and the contents of the other fluorosilanes were each not higher than 0.1 vol. %, as shown in Table 2.

EXAMPLE 6

ZnF₂, which had been obtained by reacting 1.2 moles of ZnO having a water content of 1 wt. % with an excess amount, i.e., 5 moles of F₂ having 99.0% purity, was stored in a similar manner to Example 1. By the method described in Example 4, the size of crystallites in the (110) plane was calculated. It was found to be 537 Å. Using 200 g of the ZnF₂, conversion of SiH₃Cl to SiH₃F was conducted in a similar manner to Example 5. Based on the SiH₃Cl, the yield of SiH₃F was 92 vol. %. Incidentally, the purity of the collected gas (SiH₃F) was 99 vol. % and, among analogous impurity gases, the content of SiH₂F₂ was 0.7 vol. % and the contents of the other fluorosilanes were each not higher than 0.1 vol. % , as shown in Table 2.

EXAMPLE 7

After commercial zinc fluoride tetrahydrate (ZnF₂.4H₂0) was dried at 200° C. for 4 hours, the resulting zinc fluoride was subjected to further heat treatment at 600° C. for 2 hours in a dry N₂ gas atmosphere. Thereafter, the zinc fluoride was allowed to gradually cool down to room temperature in a dry nitrogen gas atmosphere. Weight variations of the ZnF₂ so obtained were measured from room temperature to 700° C. by a differential thermobalance in a helium gas atmosphere. The weight loss was found to be 0.14%. In addition, the size of crystallites in the (110) plane of the ZnF₂ was also measured in the same manner as in Example 4. It was found to be 327 Å. Using 200 g of the ZnF₂, conversion of SiH₂Cl₂ to SiH₂F₂ was conducted in a similar manner to Example 4. Based on the SiH₂Cl₂, the yield of SiH₂F₂ was 81 vol. %. The above results are presented in Table 2.

TABLE 2

| | | Example | | | |
|---|---|---|---|---|---|
| | | 4 | 5 | 6 | 7 |
| Yield (%) | | 90 | 95 | 92 | 81 |
| Analysis value of collected gas (vol. %) | SiHF₃ | ≧99.0 | 0.7 | ≦0.1 | 0.4 |
| | SiH₂F₂ | ≦0.1 | ≧99.0 | 0.7 | 98.3 |
| | SiH₃F | ≦0.1 | ≦0.1 | ≧99.0 | 0.4 |
| | SiF₄ | 0.7 | ≦0.1 | ≦0.1 | 0.5 |
| | SiH₄ | ≦0.1 | ≦0.1 | ≦0.1 | 0.4 |

Tables 1 and 2 indicate that the Comparative Examples produced the analogous impurities in high yields but the target fluorosilanes in a low yield. In contrast, they also indicate that the Examples, which fall within the breadth of the present invention, are superior in these aspects.

What is claimed is:

1. A process for the preparation of a partially-substituted fluorosilane represented by the following formula: SiH$_n$F$_{4-n}$ wherein n stands for an integer of 1 to 3, said process comprising converting a corresponding partially-substituted chlorosilane represented by the following formula: SiH$_n$Cl$_{4-n}$ wherein n has the same meaning as defined above into the partially-substituted fluorosilane by halogen replacement while using a fluorinating agent, wherein the fluorinating agent is zinc fluoride having a water content not higher than 0.2 wt. %.

2. A process of claim 1, wherein the size of crystallites in the direction of a (110) plane of the zinc fluoride is at least 500 Å.

3. A process of claim 1, wherein the zinc fluoride has been obtained by heating ZnF₂ tetrahydrate at 150°-200° C. in the atmosphere and then subjecting the resulting ZnF₂ to heat treatment at 400°-700° C. in an atmosphere selected from the group consisting of an inert gas atmosphere and a vacuum.

4. A process of claim 1, wherein the zinc fluoride has been obtained by reacting a zinc compound selected from zinc oxide and zinc carbonate, said zinc compound having a water content not higher than 1 wt. %, with hydrogen fluoride having a water content not higher than 1 wt. %.

* * * * *